(12) United States Patent
Shabtay et al.

(10) Patent No.: US 12,033,378 B2
(45) Date of Patent: Jul. 9, 2024

(54) RESOLVING TRAINING DATASET CATEGORY AMBIGUITY

(71) Applicant: DATALOOP LTD., Herzliya (IL)

(72) Inventors: Or Shabtay, Tel-Aviv (IL); Eran Shlomo, Zichron Yaakov (IL); Avi Yashar, Natanya (IL)

(73) Assignee: DATALOOP LTD., Herzliya (IL)

(*) Notice: Subject to any disclaimer, the term of this patent is extended or adjusted under 35 U.S.C. 154(b) by 581 days.

(21) Appl. No.: 17/228,217

(22) Filed: Apr. 12, 2021

(65) Prior Publication Data

US 2021/0319264 A1    Oct. 14, 2021

Related U.S. Application Data

(60) Provisional application No. 63/009,171, filed on Apr. 13, 2020.

(51) Int. Cl.
| | | |
|---|---|---|
| *G06V 10/94* | (2022.01) | |
| *G06F 18/21* | (2023.01) | |
| *G06F 18/213* | (2023.01) | |
| *G06F 18/214* | (2023.01) | |
| *G06F 18/2431* | (2023.01) | |
| *G06N 20/00* | (2019.01) | |
| *G06V 10/24* | (2022.01) | |
| *G06V 10/30* | (2022.01) | |
| *G06V 10/32* | (2022.01) | |

(52) U.S. Cl.
CPC .......... *G06V 10/945* (2022.01); *G06F 18/213* (2023.01); *G06F 18/2148* (2023.01); *G06F 18/2185* (2023.01); *G06F 18/2431* (2023.01); *G06N 20/00* (2019.01); *G06V 10/247* (2022.01); *G06V 10/30* (2022.01); *G06V 10/32* (2022.01)

(58) Field of Classification Search
None
See application file for complete search history.

(56) References Cited

U.S. PATENT DOCUMENTS

| | | | |
|---|---|---|---|
| 11,048,979 B1* | 6/2021 | Zhdanov | G06F 18/2155 |
| 11,423,265 B1* | 8/2022 | Chen | G06T 11/00 |
| 2016/0037217 A1* | 2/2016 | Harmon | H04N 21/4542 725/9 |
| 2016/0225053 A1* | 8/2016 | Romley | G06T 7/143 |

* cited by examiner

*Primary Examiner* — Vikkram Bali
(74) *Attorney, Agent, or Firm* — The Roy Gross Law Firm, LLC; Roy Gross

(57) ABSTRACT

A method comprising: receiving a dataset comprising (i) a plurality of images, and (ii) a set of classes associated with one or more objects in the images; selecting at least one image from the dataset; applying one or more transformations to the selected image, to create a set of transformed images, wherein each of the transformed images includes a representation of at least one of the objects; annotating at least some of the objects in the selected image and at least some of the transformed images, wherein the annotating comprises assigning each of the one or more objects to one of the classes; and calculating an ambiguity score with respect to at least one pair of classes in the set of classes, based, at least in part, on a number of times the annotating assigned a one of the objects to both of the classes in the pair.

17 Claims, 13 Drawing Sheets

RESOLVING TRAINING DATASET CATEGORY AMBIGUITY

CROSS-REFERENCE TO RELATED APPLICATIONS

This application claims the benefit of priority U.S. Provisional Patent Application No. 63/009,171, filed Apr. 13, 2020, the content of which is incorporated by reference herein in its entirety.

BACKGROUND OF THE INVENTION

The invention relates to the field of machine learning.

Machine learning models have achieved state-of-the-art performance in various visual recognition tasks, such as image classification, object detection, and semantic segmentation. The availability of a large set of training images is one of the most important factors for their success.

However, collecting sufficient training images with accurate labeling may be costly and time consuming. For example, it may be difficult even for specialists in a given domain to accurately segment images for labeling, such as when annotating image pixels that are close to object boundaries.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

There is provided, in an embodiment, a system comprising at least one hardware processor; and a non-transitory computer-readable storage medium having stored thereon program instructions, the program instructions executable by the at least one hardware processor to: receive, as input, a dataset comprising: (i) a plurality of images, and (ii) a set of classes associated with one or more objects in each of the images, select at least one image from the dataset, apply one or more transformations to the selected image, to create a set of transformed images, wherein each of the transformed images includes a representation of at least one of the one or more objects, annotate at least some of the objects in the selected image and at least some of the transformed images, wherein the annotating comprises assigning each of said one or more objects to one of the classes, and calculate an ambiguity score with respect to at least one pair of classes in the set of classes, based, at least in part, on a number of times the annotating assigned one of the objects to both of the classes in the pair.

There is also provided, in an embodiment, a computer-implemented method comprising: receiving, as input, a dataset comprising (i) a plurality of images, and (ii) a set of classes associated with one or more objects in each of the images; selecting at least one image from the dataset; applying one or more transformations to the selected image, to create a set of transformed images, wherein each of the transformed images includes a representation of at least one of the one or more objects; annotating at least some of the objects in the selected image and at least some of the transformed images, wherein the annotating comprises assigning each of said one or more objects to one of the classes; and calculating an ambiguity score with respect to at least one pair of classes in the set of classes, based, at least in part, on a number of times the annotating assigned one of the objects to both of the classes in the pair.

There is further provided, in an embodiment, a computer program product comprising a non-transitory computer-readable storage medium having program instructions embodied therewith, the program instructions executable by at least one hardware processor to: receive, as input, a dataset comprising (i) a plurality of images, and (ii) a set of classes associated with one or more objects in each of the images; select at least one image from the dataset; apply one or more transformations to the selected image, to create a set of transformed images, wherein each of the transformed images includes a representation of at least one of the one or more objects; annotate at least some of the objects in the selected image and at least some of the transformed images, wherein the annotating comprises assigning each of said one or more objects to one of the classes; and calculate an ambiguity score with respect to at least one pair of classes in the set of classes, based, at least in part, on a number of times the annotating assigned one of the objects to both of the classes in the pair.

In some embodiments, the program instructions are further executable to generate, and the method further comprises generating, a modified set of classes by performing one or more of: removing, from said set of classes, at least one class in said at least one pair of classes; dividing at least one class in said at least one pair of classes into two or more sub-classes; and adding one or more new classes to said set of classes In some embodiments, the program instructions are further executable to replace, and the method further comprises replacing, in the dataset, the set of classes with the modified set of classes.

In some embodiments, the transformations comprise dividing the selected image into two or more sub-images, wherein at least one pair of adjacent sub-images of the two or more sub-images includes an overlapping region.

In some embodiments, the transformations are selected from the group consisting of: image tiling, image patch extraction, and image splitting.

In some embodiments, at least one of the sub-images undergoes a further transformation selected from the group consisting of: image enhancement, image contrast enhancement, image contrast stretching, image gray level thresholding, image color changes, image filtering, image Gaussian blur, image sharpening, image gamma correction, image shearing, image padding, image reflection, image warping, image scaling, image rotation, image translation, image flipping, an affine image transformation, and a geometric image transformation.

In some embodiments, with respect to any one of the annotated objects, the annotation comprises at least one of: enclosing the object in a bounding region, enclosing the object in a three-dimensional region; representing the object as a polygon mesh; denoting a set of landmarks associated with the object; denoting a set of lines associated with the object; denoting segmentation boundaries associated with the object; denoting a text annotation associated with the object; and detecting video tracking information associated with the object.

In some embodiments, with respect to any one of the annotated objects, the annotation comprises (i) denoting segmentation boundaries associated with the object, and (ii) assigning each pixel within the segmentation boundaries to one of the classes.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION OF THE INVENTION

Figure 1:
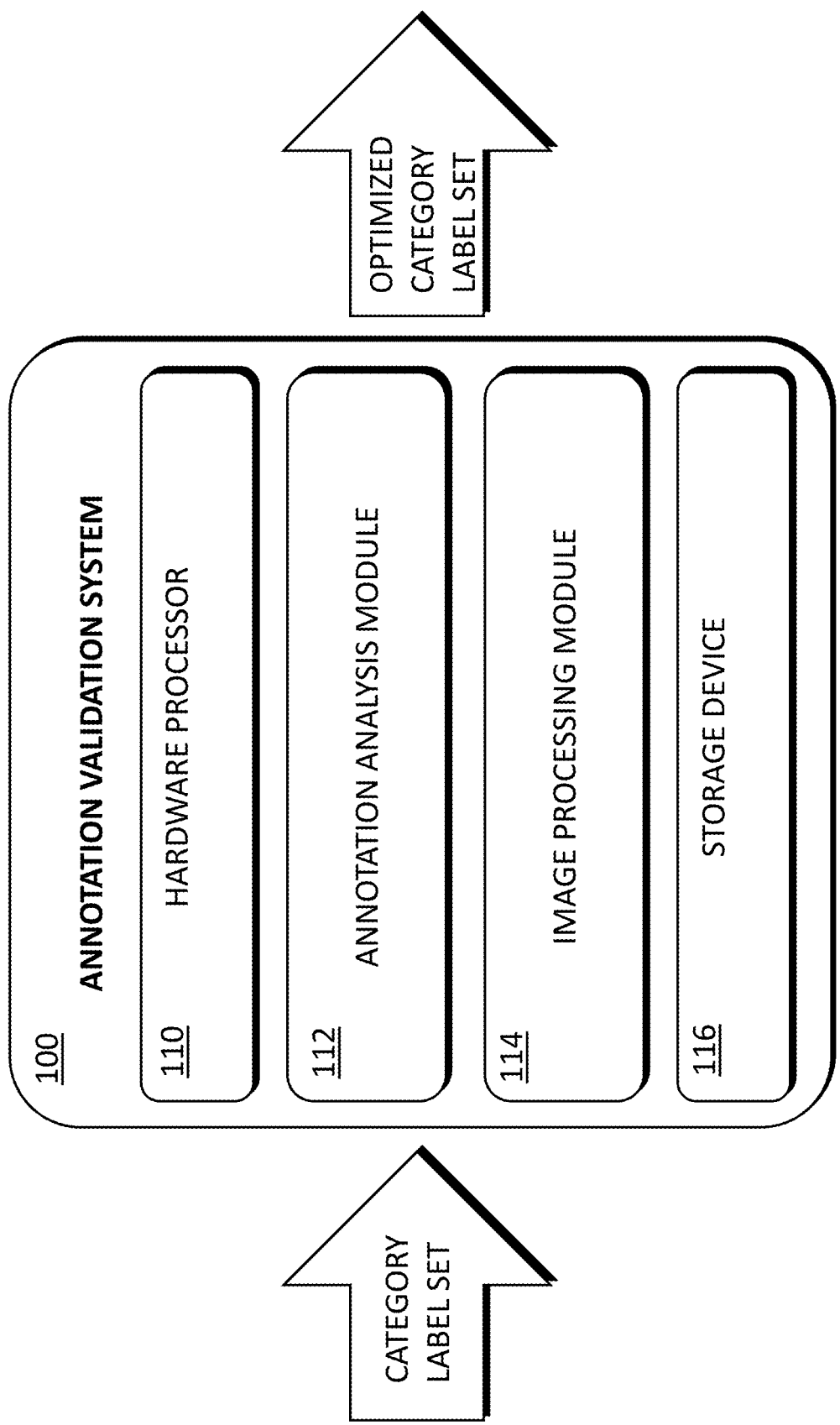
FIG. 1 illustrates an exemplary system for training dataset annotation validation and optimization, in accordance with some embodiments of the present invention.

Disclosed herein is a technique, embodied in a system, method, and computer program product, for automated evaluation and optimization of a training data annotation scheme. In some embodiments, the present disclosure provides for validating and optimizing a given list of classes or categories associated with an annotation task, wherein the annotation task generates a training dataset intended for training one or more machine learning models.

In some embodiments, the present disclosure optimizes a list of classes (also referred to as categories) used to annotate data samples in a machine learning task, by detecting and resolving potential ambiguities among the given classes. In some embodiments, an optimized set of classes or categories for a given annotation task may lead to a reduction in annotation errors, and hence to better training results.

As noted above, to generate the large sample data sets that are necessary for training and optimizing machine learning models, existing techniques typically require human annotators to manually annotate data instances. For example, to train a machine learning model to perform object detection and segmentation in images, annotators must manually trace boundaries around objects, and assign them to a class from a list of classes associated with the annotation task. Once a machine learning model has been trained on the annotated data, it can be inferenced over a new data instance to, i.e., detect objects in a previously-unseen image, and correctly assign these objects to classes.

However, obtaining a sufficient quantity of manually-annotated data samples to effectively train a machine learning model is often time consuming, costly, and prone to errors. For example, human annotators are not very adept at manually tracing segmentation boundaries, defining a best-fit edge, or placing a best-fit bounding box around an object of interest. Given the large number and variety of images that must be segmented and annotated on the one hand, and the large variability in skill and technique among human annotators on the other hand, the amount and extent of errors may be significant.

In addition, the potential for annotation errors may be further exacerbated when the list of classes or categories given for an annotation task is itself suboptimal or ambiguous, which may lead to an even greater variability in the way individual annotators assign objects to classes.

Accordingly, in some embodiments, the present disclosure provides for an automated method which identifies class ambiguities in multi-class machine learning tasks.

The following discussion will focus primarily on applications of the present disclosure in the area of object detection, image segmentation, and similar classification tasks. However, the present method may be equally applied in additional and/or other classification tasks, including, e.g., object recognition, semantic segmentation, natural language processing, speech recognition, sentiment analysis, and the like.

In some embodiments, a training dataset may be provided in connection with a machine learning model training task, wherein the training dataset has an associated set of classes. In some embodiments, at least one data instance in the training dataset may be selected. For example, in a dataset of images, at least one image may be selected from an image dataset. In some embodiments, the selected data instance may undergo one or more transformations, e.g., in the case of an image, the image may undergo a tiling process to produce a set of overlapping tiles representing the original image with overlapping regions at the edges of each tile. In other examples, additional and/or other transformations may be used, with or without overlapping regions.

In some embodiments, the set of transformed images may be annotated, e.g., by one or more human annotators, using the provided class labels set, to obtain at least two separate annotations for each image element (e.g., pixel, segment, object, region, etc.) in the original image. In some embodiments, the set of annotations may be then collapsed back into the original image, e.g., annotated segmentation with a class label may be copied back to corresponding coordinates in the original image.

In some embodiments, at least some of the annotations with respect to each image element (e.g., pixel, object and/or a segment) in the original image may be different and/or conflicting. For example, an object in the image may be annotated two or more times, each time with a different bounding region or segment enclosing the object. In another example, an object may be assigned by different annotators to two or more different classes, wherein the same object may be annotated with multiple different labels associated with the different classes to which it is assigned. In some embodiments, the present disclosure then provides for generating a matrix which sums the different annotations with respect to each image element, wherein an intersection of each pair of classes receives an ambiguity score based on the total number of image elements concurrently assigned to both classes and receiving both associated labels in the pair of classes.

In some embodiments, the class ambiguity scores produced by the disclosed process may be used for resolving ambiguities between potentially conflicting class labels, e.g., by splitting a class labels into two or more sub-classes or sub-categories, combining two or more classes or categories into a single class or category, and/or additional and/or other resolution methods.

A potential advantage of the present disclosure is, therefore, in that it may provide for increasing the accuracy of training dataset annotations, by optimizing class label selection in a machine learning classification task. In some embodiments, the disclosed method greatly improves the speed and accuracy of manually annotating images in image annotation tasks, and thus may lead to a reduction in costs and annotation errors, and hence to better training results.

FIG. 1 illustrates an exemplary system 100 for automated validation and optimization of a training data annotation scheme, in accordance with some embodiments of the present invention. System 100 as described herein is only an exemplary embodiment of the present invention, and in practice may have more or fewer components than shown, may combine two or more of the components, or a may have a different configuration or arrangement of the components. The various components of system 100 may be implemented in hardware, software, or a combination of both hardware and software. In various embodiments, system 100 may comprise a dedicated hardware device, or may form an addition to or extension of an existing device.

In some embodiments, system 100 may comprise a hardware processor 110 and memory storage device 116, comprising a random-access memory (RAM) and one or more non-transitory computer-readable storage device(s). In some embodiments, system 100 may store in a non-volatile memory thereof, such as storage device 116, software instructions or components configured to operate a processing unit (also 'hardware processor,' 'CPU,' or simply 'processor'), such as hardware processor 110. The program instructions may include one or more software modules, such as an annotation analysis module 112, and image processing module 114. In some embodiments, the software components may include an operating system, including various software components and/or drivers for controlling and managing general system tasks (e.g., memory management, storage device control, power management, etc.) and facilitating communication between various hardware and software components.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

In some embodiments, the image processing module 114 may be configured to receive image data and apply any one or more image processing and/or computer vision algorithms or techniques. In some embodiments, image processing module 114 may be configured to perform one or more of object detection, object recognition, object tracking, and/or image segmentation based on one or more image processing techniques. In some embodiments, image processing module 114 may be configured to perform one or more desired image modifications, transformations, filtering, enhancing, and/or any other manipulations with respect to received image data. As used herein, terms 'image,' image data,' and/or 'digital image' refer to any digital data capable of producing a visual representation, including digital images and digital video. Such data may comprise digital files in any suitable format, e.g., JPG, TIFF, BMP, PNG, RAW, or PDF files. Video data may refer to a digital sequence of images comprising comprise digital files in any suitable format, e.g., FLV, GIF, MOV, QT, AVI, WMV, MP4, MPG, MPEG, or M4V. Although much of the disclosure herein focuses on digital images, the present disclosure may be equally applied with regard to any type of digital visual media. For instance, in addition to digital images, the present disclosure may also apply with respect to multiple images/frames in a digital video. Depending on the embodiment, the image processing module 114 can also transmit and/or route image data through various processing functions, or to an output circuit that sends received and/or processed image data for further processing by one or more other modules of system 100; for presentation, e.g., on a display; to a recording system; across a network; or to any other logical destination. The image processing module 114 may apply any image processing algorithms alone or in combination. Image processing module 114 may also facilitate logging or recording operations with respect to any image data scan.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 100 may be co-located or distributed, or the system may be configured to run as one or more cloud computing 'instances,' 'containers,' 'virtual machines,' or other types of encapsulated software applications, as known in the art. As one example, system 100 may in fact be realized by two or more separate but similar systems. These two or more systems may cooperate, such as by transmitting data from one system to the other (over a local area network, a wide area network, etc.), so as to use the output of one module as input to the other module.

The instructions of analysis module 112 and/or image processing module 114 are now discussed with reference to the flowchart of FIG. 2, which illustrates the functional steps in a method for automated real-time confidence score validation, in accordance with some embodiments of the present invention.

Figure 2:
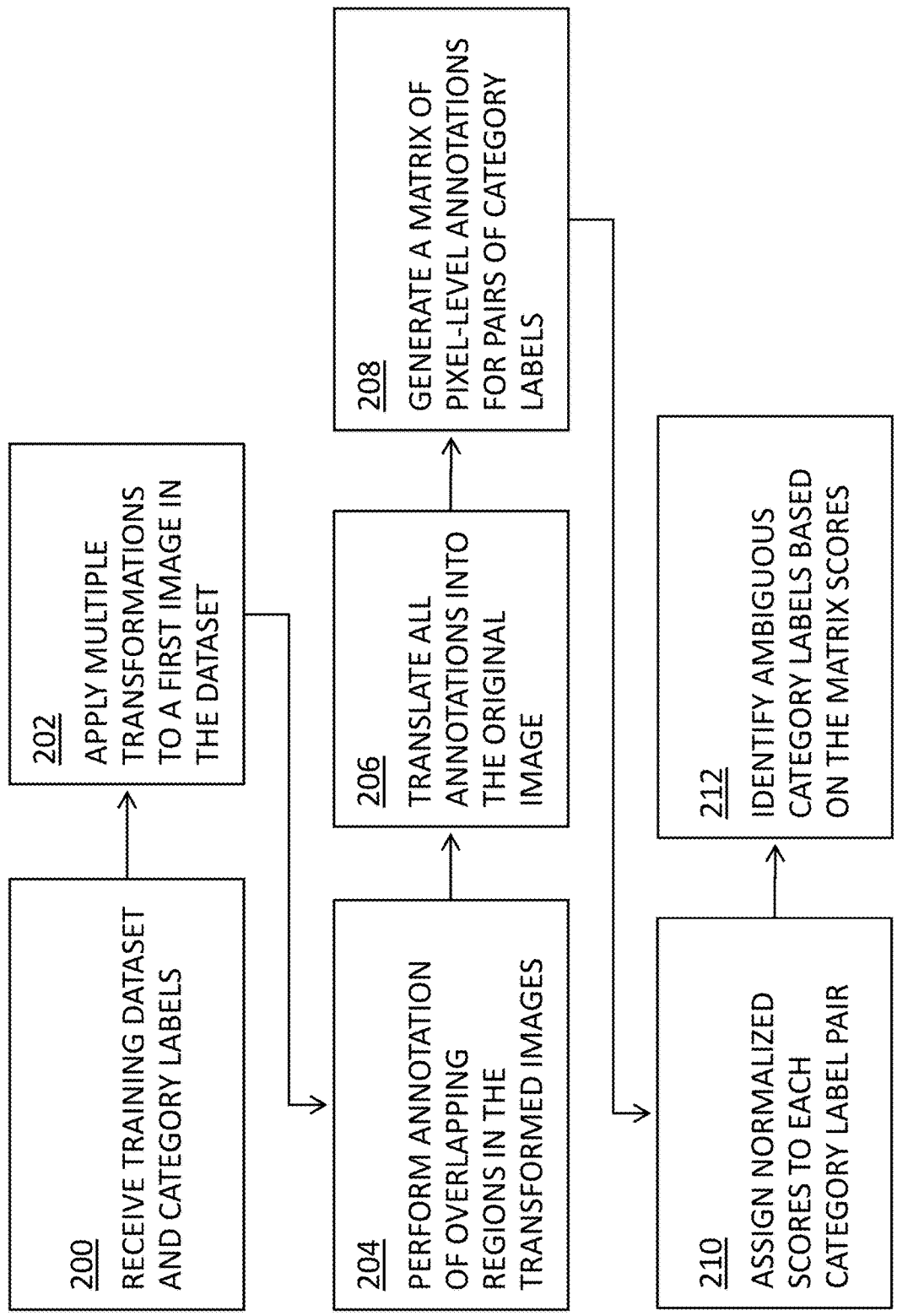
FIG. 2 is a flowchart detailing the functional steps in a process for training dataset annotation validation and optimization, in accordance with some embodiments of the present invention.

FIG. 2 is a flowchart detailing the functional steps in a process for automated validation and optimization of a training data annotation scheme, in accordance with some embodiments of the present invention.

In some embodiments, in step 200, system 100 receives, as input, a training dataset comprising, e.g., a plurality of images. In some embodiments, the training dataset may be configured for training a machine learning model to perform an intended prediction task over an input data instance, and to output a result associated with each inference instance.

In some embodiments, system 100 further receives, as input, an initial set of class labels associated with the intended prediction task in said images. In some embodiments, the input training dataset may be used of training a machine learning model to perform object detection, classification, segmentation, and/or any other similar prediction task.

The terms 'annotation' or 'labeling' as used herein may refer to the process of capturing an object of interest in an image, to make it recognizable and understandable to a machine through computer vision. An annotation process is used to generate training data, which is turn is used to train a machine learning model to learn the certain patterns of the annotated objects and correlate the results, and then recognize similar patterns in future previously-unseen test samples, to predict these results. Training data annotations can consist of, e.g.:

- 2-D bounding boxes or regions enclosing individual objects in images;
- 3-D (e.g., cuboids) bounding regions in images;
- polygons;
- points and landmarks;
- lines and splines;
- semantic segmentation (e.g., pixel-level annotation);
- text annotation; and/or
- video object tracking.

The terms 'class,' 'category,' 'class label,' 'label,' and 'type' when referring to objects in an image, can be considered synonymous terms with regard to the classification of an object.

The terms 'machine learning model' and 'machine learning classifier' are used interchangeably, and may be abbreviated 'model' or 'classifier' for simplicity. These terms are intended to refer to any type of machine learning model which is capable of producing an output, be it a classification, a prediction, or generation of new data, based on input.

In addition, the terms 'detection,' 'classification' and 'prediction' are used interchangeably for reasons of simplicity, and are intended to refer to any type of output of a machine learning model. This output may be in the form of a class and a score which indicates the certainty that the input belongs to that class. Various types of machine learning models may be configured to handle different types of input and produce respective types of output; all such types are intended to be covered by present embodiments.

By way of example only, the present disclosure will be described herein mainly with reference to the task of semantic segmentation in images. However, it will be appreciated by any artisan skilled in the art that the present process may be equally successfully applied in the context of any machine learning-based classification and/or prediction task which involves probabilistic classification, such as document classification, sentiment analysis, pixel classification, object segmentation, and the like.

In some embodiments, in step 202, at least one image is selected from the input training dataset, wherein image processing module 114 may perform one or more transformations thereto, to generate a set of transformed images.

In some embodiments, the set of transformed images generated in step 202 comprises one or more transformed images representing the original input image or any portion thereof. In some embodiments, each such transformed image in the set includes at least one element of the original input image, such as, but not limited to:

- A pixel,
- a cluster of pixels,
- an image segment,
- an image object,
- an image feature,
- an image edge,
- an image line, and/or
- any other region or sub-region of the image.

Accordingly, such an element of the original input image is represented at least twice: once in the original input image, and at least once in a transformed image of the set of transformed images.

In some embodiments, the one or more transformations applied to the original input image include such operations as splitting, tiling, and patch extraction along one or more division lines in the original input image. In such cases, each pair of adjacent image splits, segments, tiles, and/or patches will include an overlapping area, typically straddling the division line.

Accordingly, in some embodiments, the transformations may comprise, but are not limited to:

- Tiling: Dividing an image into two or more sub-images, wherein at least a portion of each adjacent pair of tiles is overlapping.
- Patch extraction: Extracting one or more patches from an image, wherein at least a portion of each adjacent pair of patches is overlapping.
- Splitting: Splitting an image into two or more portion, wherein at least a portion of each adjacent pair of portions is overlapping.

In some embodiments, the transformed image is the transformed set may undergo additional one or more transformation operations, including, but not limited to:

- Image enhancements (e.g., contrast enhancements, contrast stretching, gray level thresholding);
- color changes;
- filtering,
- Gaussian blur;
- sharpening;
- gamma correction;
- shearing;
- padding;
- reflection;
- warping;
- scaling;
- rotations;
- translations;
- flipping;
- any other affine transformations; and/or
- projections.

Figure 3A:
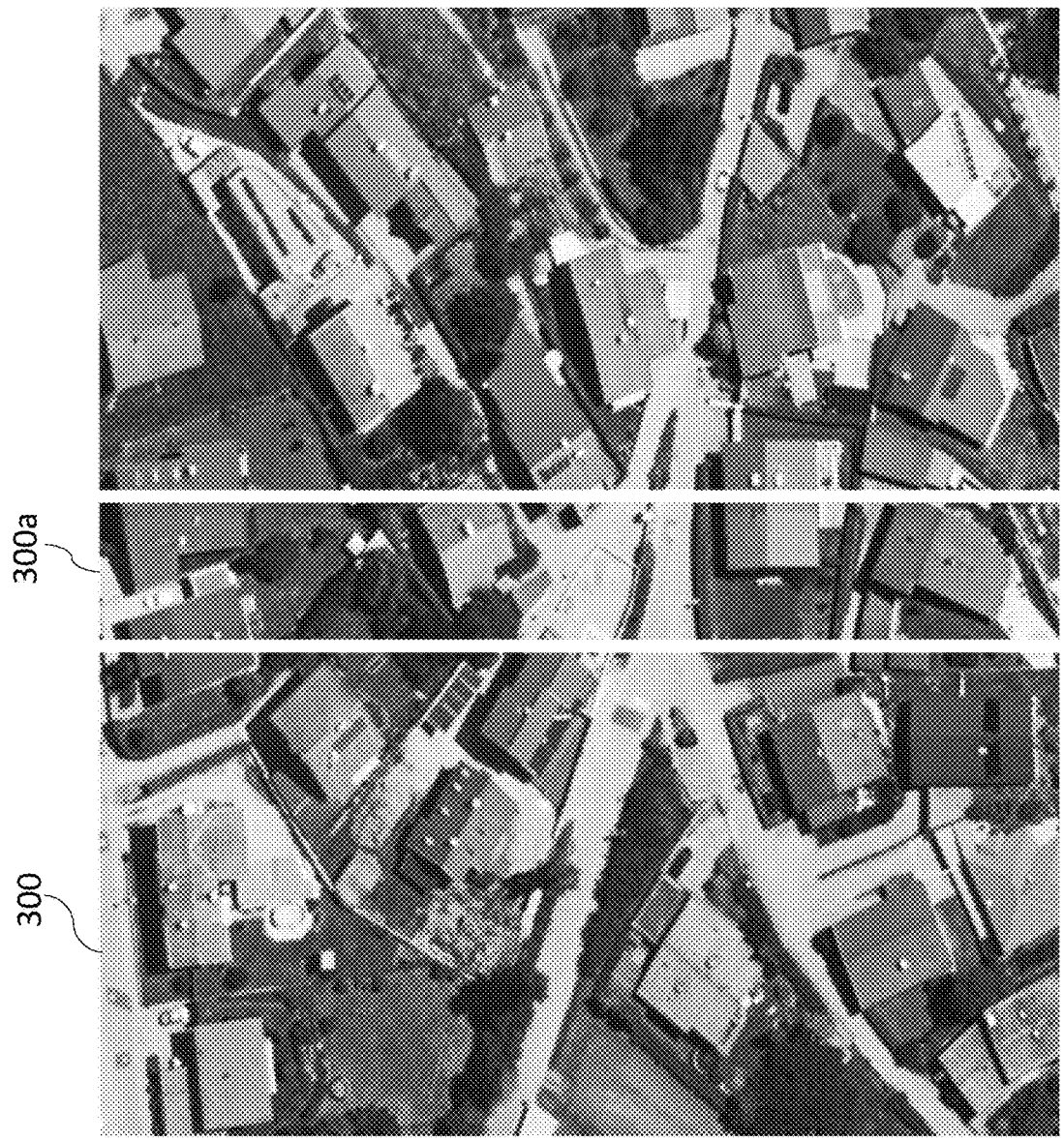
FIGS. 3A-3C and 4A-4B show exemplary image transformations, in accordance with some embodiments of the present invention.

FIG. 3A shows an image 300 comprising an aerial view of a geographical region, wherein image 300 comprises a sub-region bounded by lines 300a. FIG. 300 may be presented for an annotation task, wherein an annotator may be tasked with detecting objects in FIG. 300 and correctly assigning them to one or more classes from a set of classes provided for the annotation task. For example, an annotation may include delineating an object within a segment boundary and/or a bounding box, and assigning the object to a correct class, based on the detection. For example, each pixel within a segmented or bounded region may be annotated with a label associated with the selected class to which the object may have been assigned.

Figure 3B:
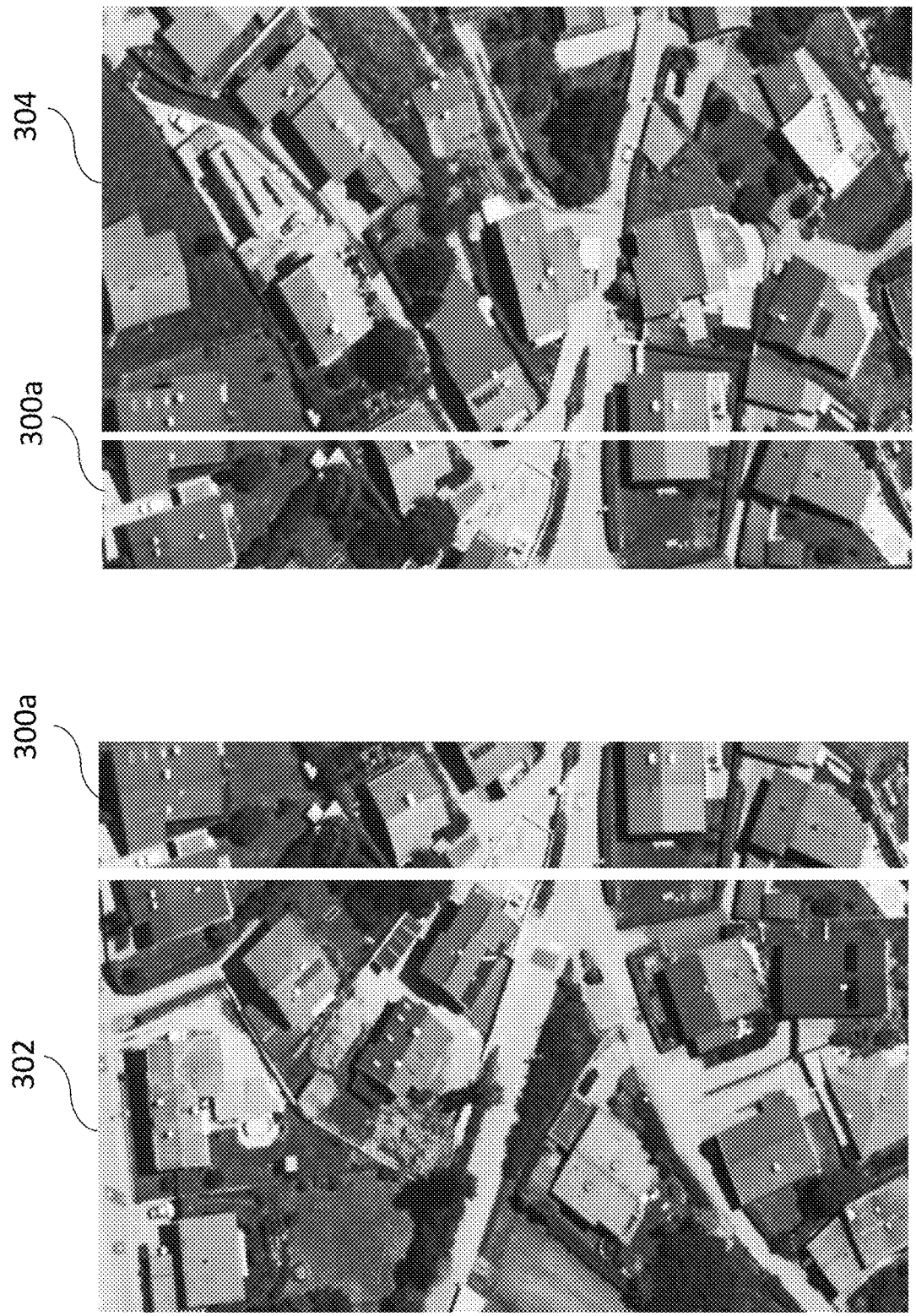
Figure 3C:
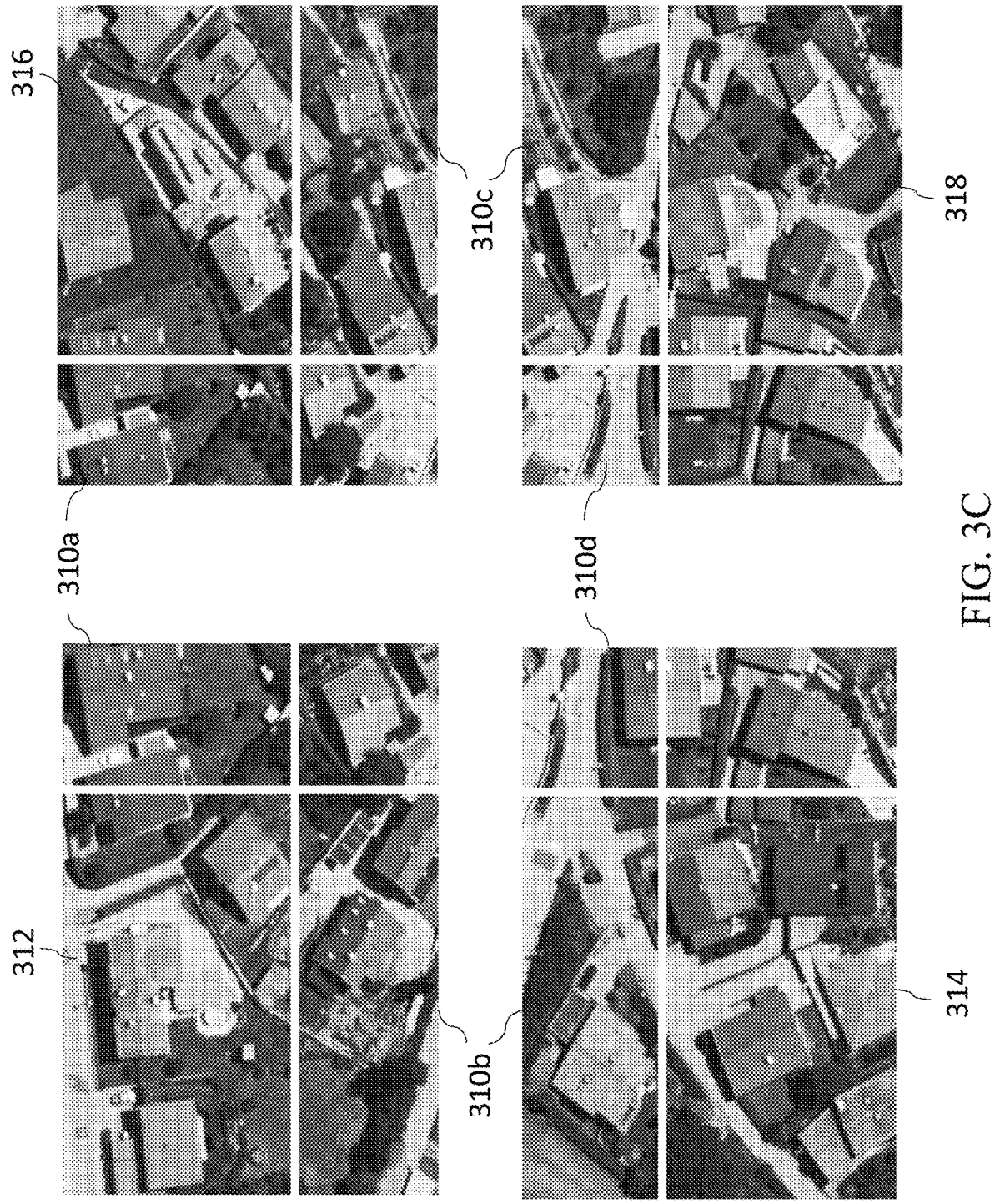

In some embodiments, as depicted in FIG. 3B, image 300 may be transformed by splitting image 300 into two separate overlapping images 302, 304, wherein images 302, 304 share an overlapping edge sub-region 300a included in both images 302, 304. FIG. 3C shows aerial image 300 split four-ways into four separate split images 312-318. Each pair of adjacent splits shares an overlapping region as follows:

Images 312 and 316 share overlapping edge region 310a
images 312 and 314 share overlapping edge region 310b, images 316 and 318 share overlapping edge region 310c, and images 314 and 318 share overlapping edge region 310d.

Figure 4A:
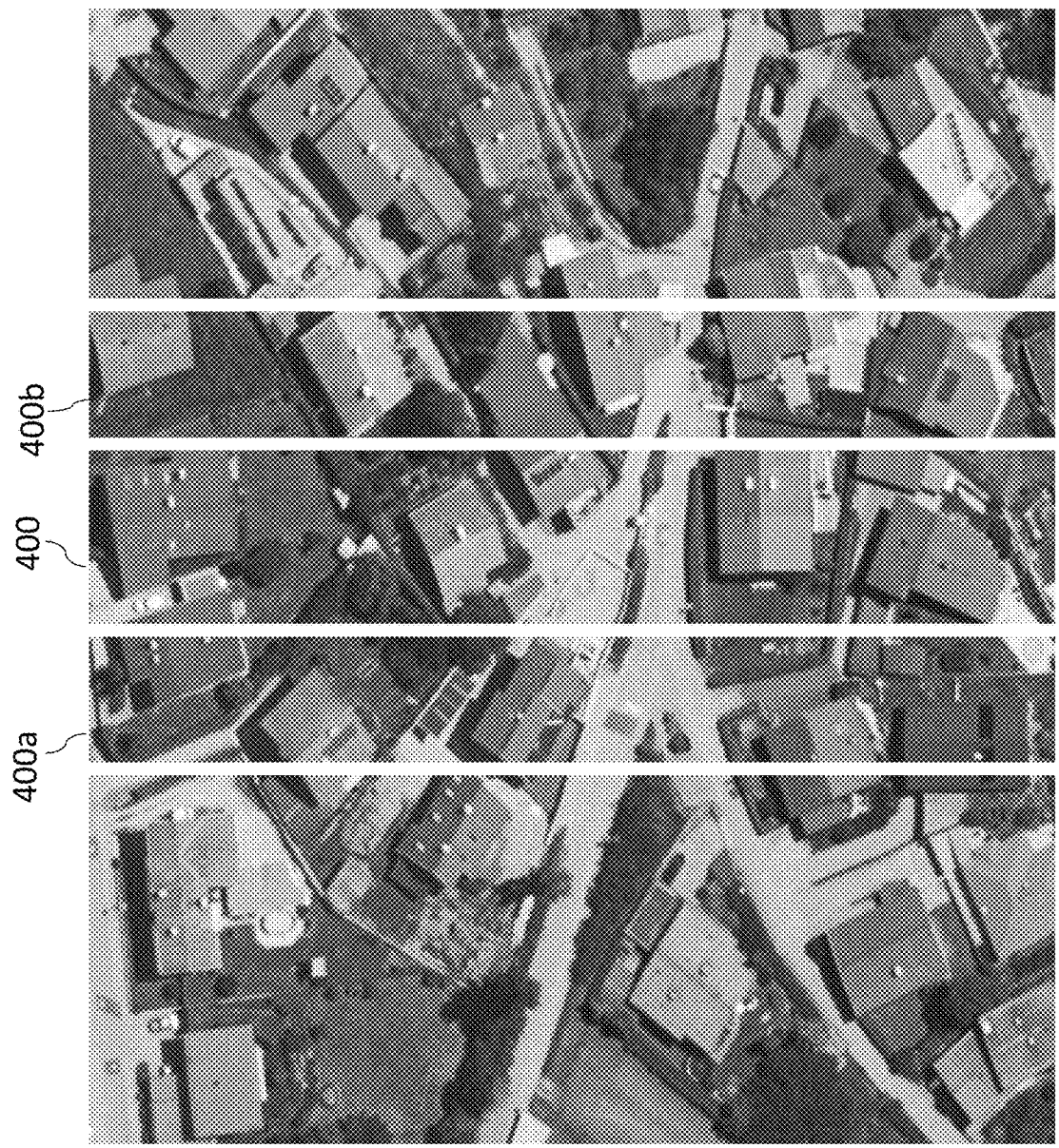
Figure 4B:
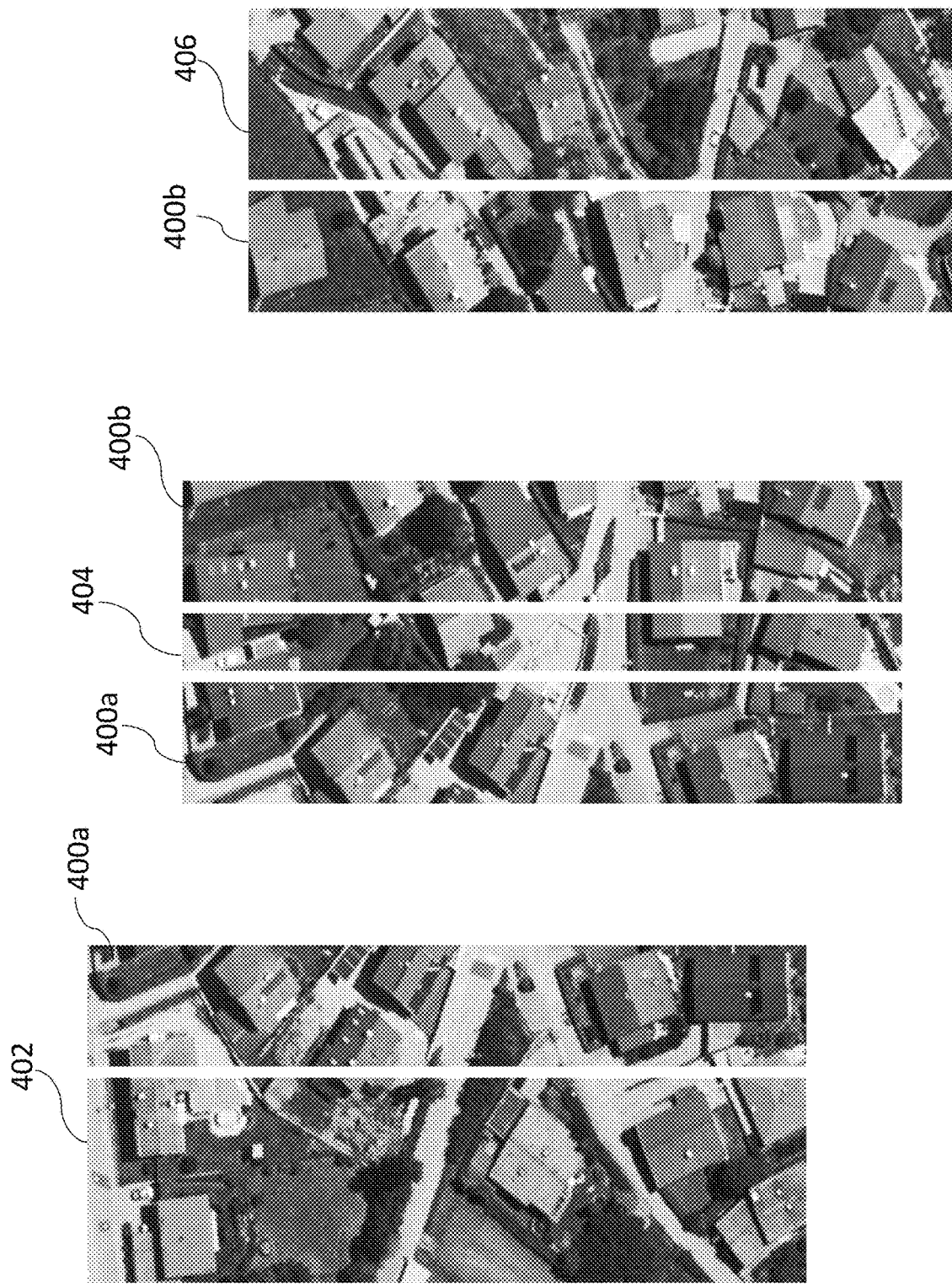

FIG. 4A is another example of an image 400 comprising image sub-regions bounded by a lines 400a and 400b. In some embodiments, as shown in FIG. 4B, image 400 may be split into 3 images 402, 404, 406, wherein images 402, 404 share an overlapping edge region 400a, and images 404, 406 share an overlapping edge region 400b.

Figure 5A:
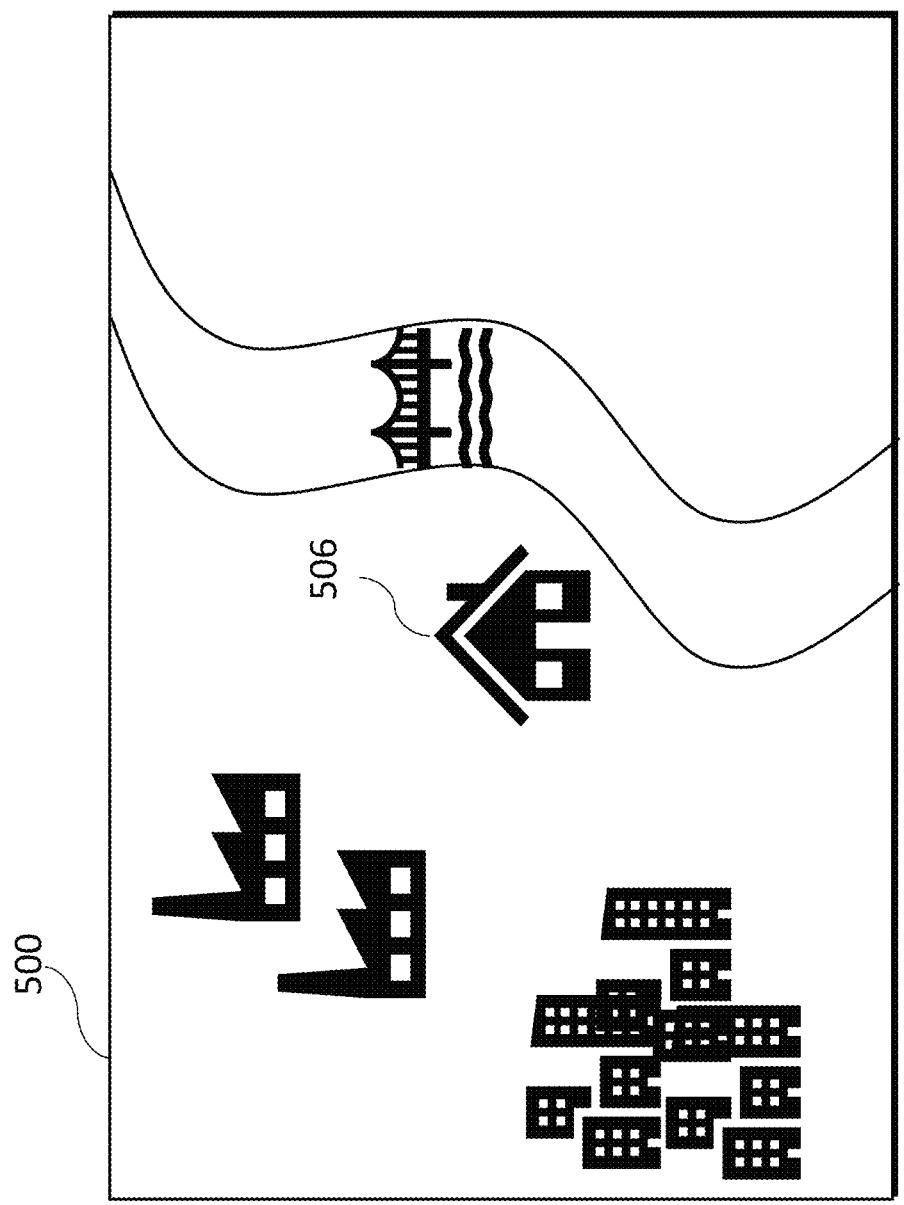
FIGS. 5A-5C schematically illustrate a process for training dataset annotation validation and optimization, in accordance with some embodiments of the present invention.

In some embodiments, in step 204, an annotation process may be performed with respect to the transformed images. For example, with reference to FIGS. 5A-5B, image 500 is transformed into images 502, 504, wherein an overlapping region 500a is shared by images 502, 504.

In some embodiments, an annotation process (e.g., manual annotation by a human annotator) may take place in which an annotator draws or adjusts, e.g., bounding boxes and/or segmentation boundaries around objects of interest, and assigns each such object to a class from a provided set of classes for the annotator task. In some embodiments, a manual annotation process may be implemented through, e.g., annotation analysis module 112, using, e.g., a graphic user interface. In these cases, the user interface may display images, and a second layer may be overlaid over the images to allow user interactions, enabling a user to input an annotation by drawing a bounding box and/or segmentation boundaries directly over the displayed image.

In some embodiments, an annotation or bounding box received as an input by annotation analysis module 112 may comprise, e.g., a set of coordinates associated with bounding boxes and/or a class label associated with each pixel within a segmented region. For example, with reference to FIG. 5B, objects in images 502, 504 are segmented and labeled with a class label (e.g., "factory," "building," house," "river," "bridge"). Accordingly, with respect to each segmented region, each pixel contained within the region receives the class label applicable to the region.

In some embodiments, overlapping image portions shared by transformed images (e.g., with reference to FIGS. 5A-5C, region 500a in images 502, 504) may by annotated separately, by the same or by two or more different annotators. In some embodiments, this may result in differences in annotation of objects in the overlapping portion 500a. For example, some objects in the original image 500 may appear in partial form and/or subject to other transformations in the split transformed images 502, 504. Thus, house 506 may appear in partial form in split transformed images 502, 504 and thus may receive varying annotations (e.g., "house" and "factory"), because a full aspect of the object in not available. Accordingly, house 506 may be annotated as "house" in image 502, and as "factory" in image 504. In some embodiments, the transformation process in step 202 may help reveal and/or expose class label pairs wherein a distinction and/or differentiation between the pair less robust, and thus may lead to conflicting annotations.

Figure 6A:
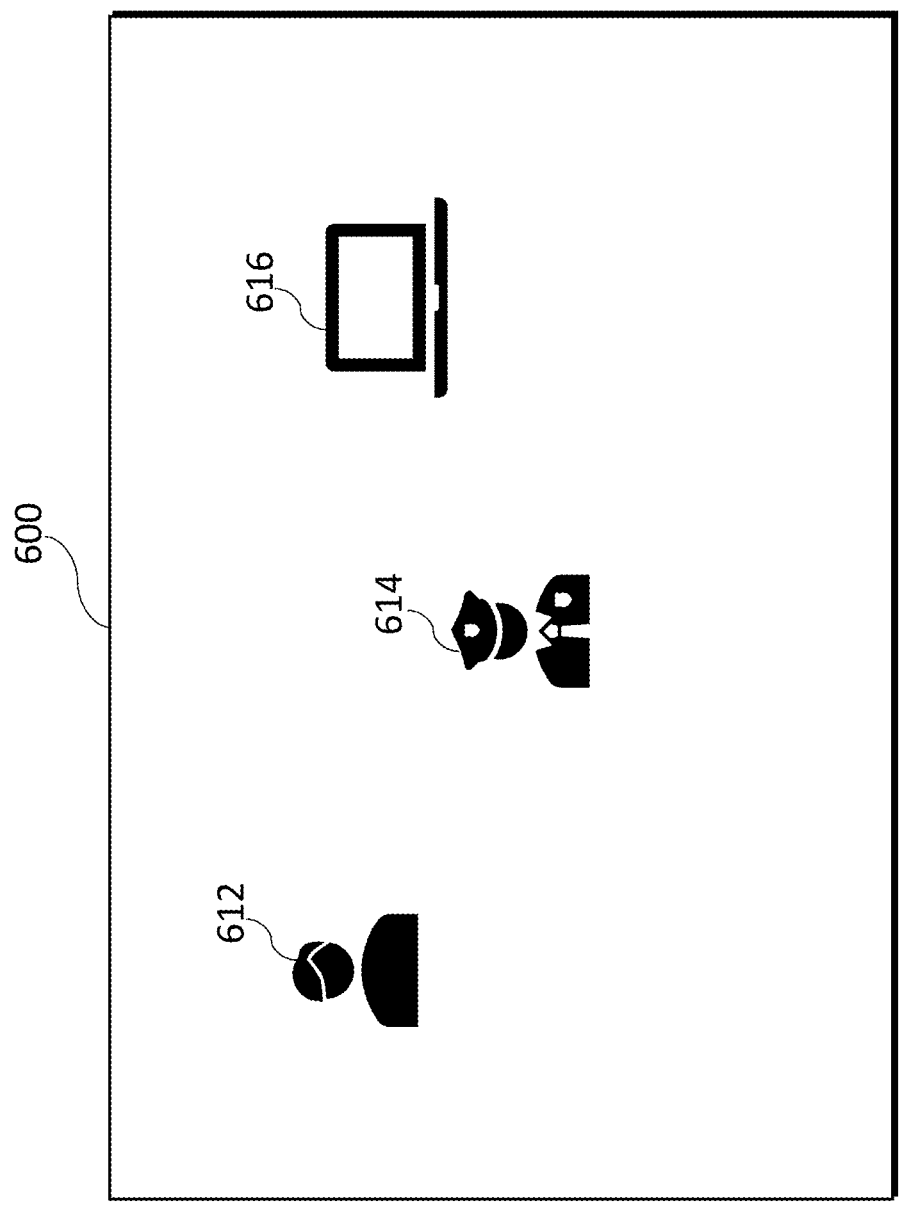
FIGS. 6A-6C schematically illustrate a process for training dataset annotation validation and optimization, in accordance with some embodiments of the present invention.
Figure 6B:
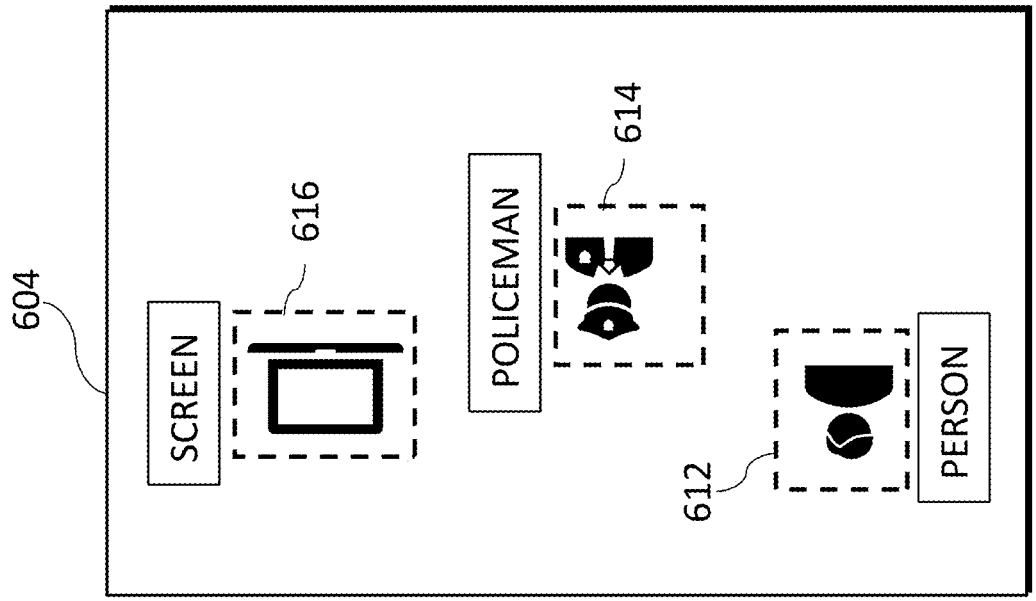
Figure 6B:
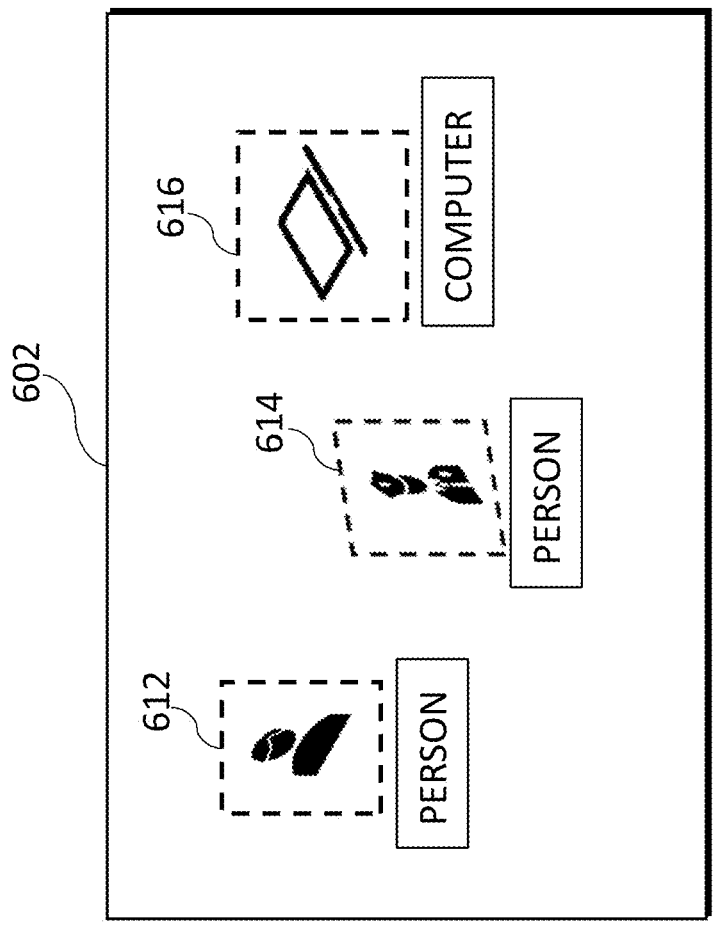

FIGS. 6A-6B illustrate another annotation task example. FIG. 600 comprises objects (e.g., "person," "policeman,"

and "computer"). The annotation task may require an annotator to enclose each object within a bounding box or region and assigning the detected object to a class from among the one or more classes associated with the annotation task. The list or set of classes provided for the task may include the following classes:

Person
Policeman
Computer
Screen

With reference to FIG. 6B, image 600 may be transformed into images 602, 604, wherein image 602 represents a warping transformation relative to image 600, and image 604 represents a rotation transformation of image 600. Images 602, 604 may by annotated by two or more different annotators separately, by applying bounding regions enclosing detected objects. However, potential 602, 604, wherein policeman 614 has conflicting labels "person" and "policeman," and computer 616 has conflicting labels "computer" ambiguities among the classes or categories given for an annotation task may result in differences in annotation of objects in the transformed images 602, 604. For example, policeman 614 may be variously annotated as "person" in image 602, and as "policeman" in image 604. Similarly, computer 616 may be variously annotated as "computer" in image 602, and as "screen" in image 604.

Figure 5B:
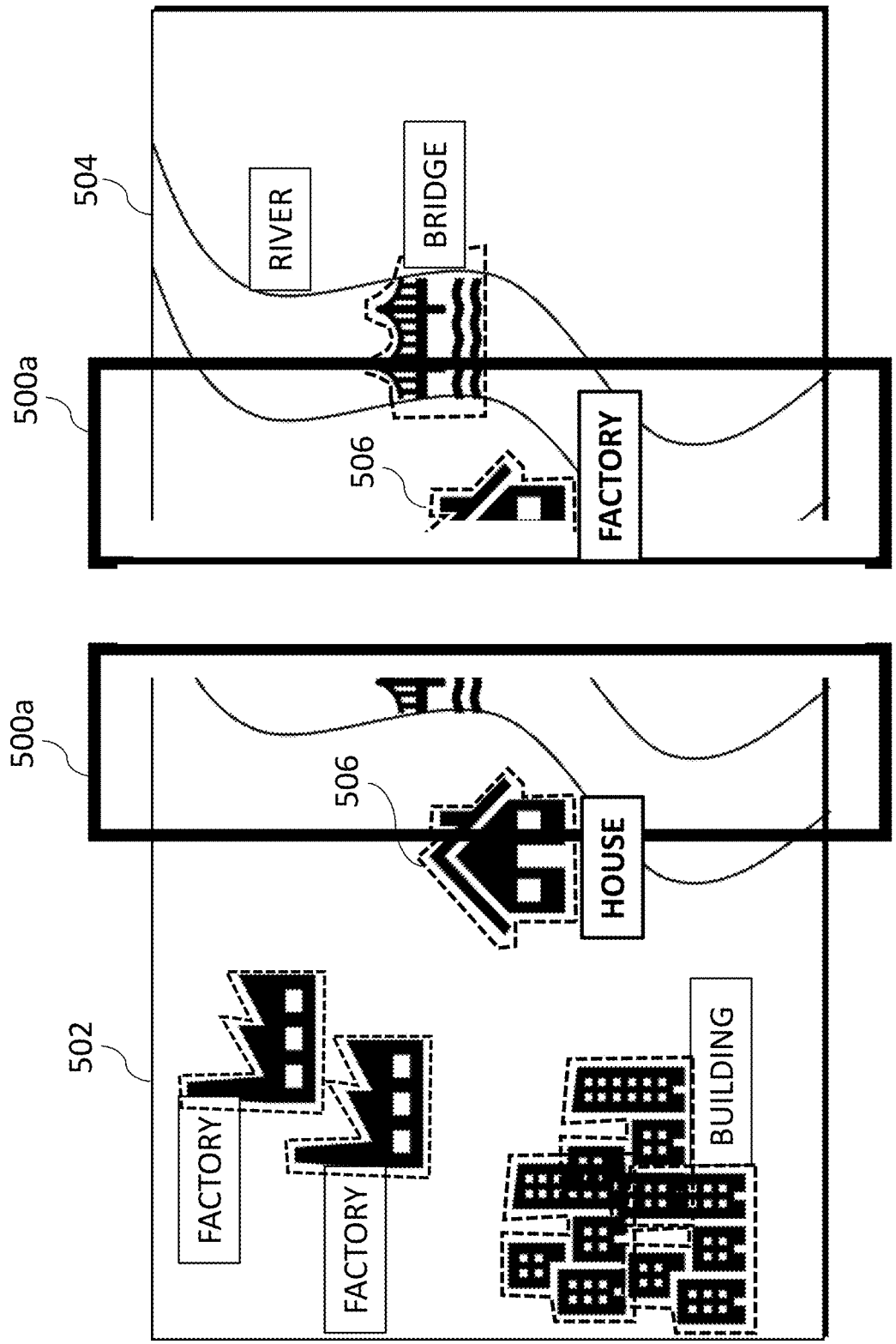
Figure 5C:
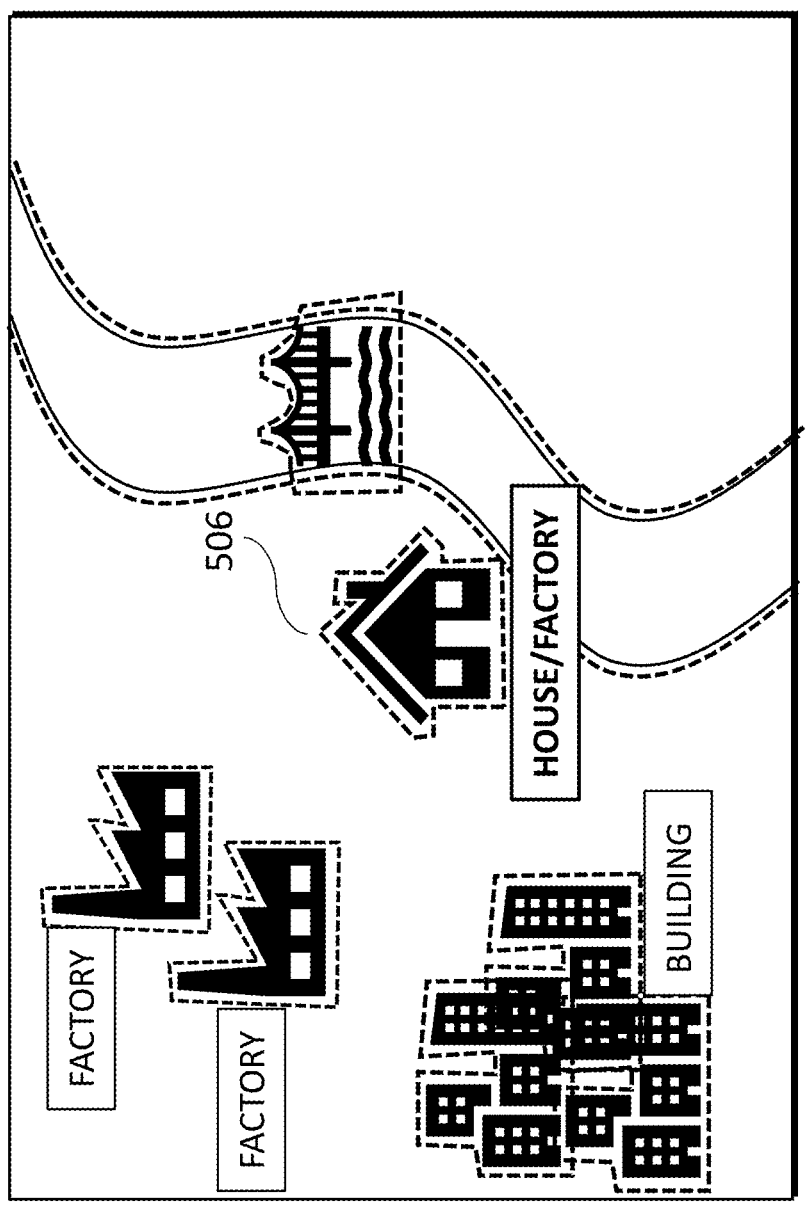
Figure 6C:
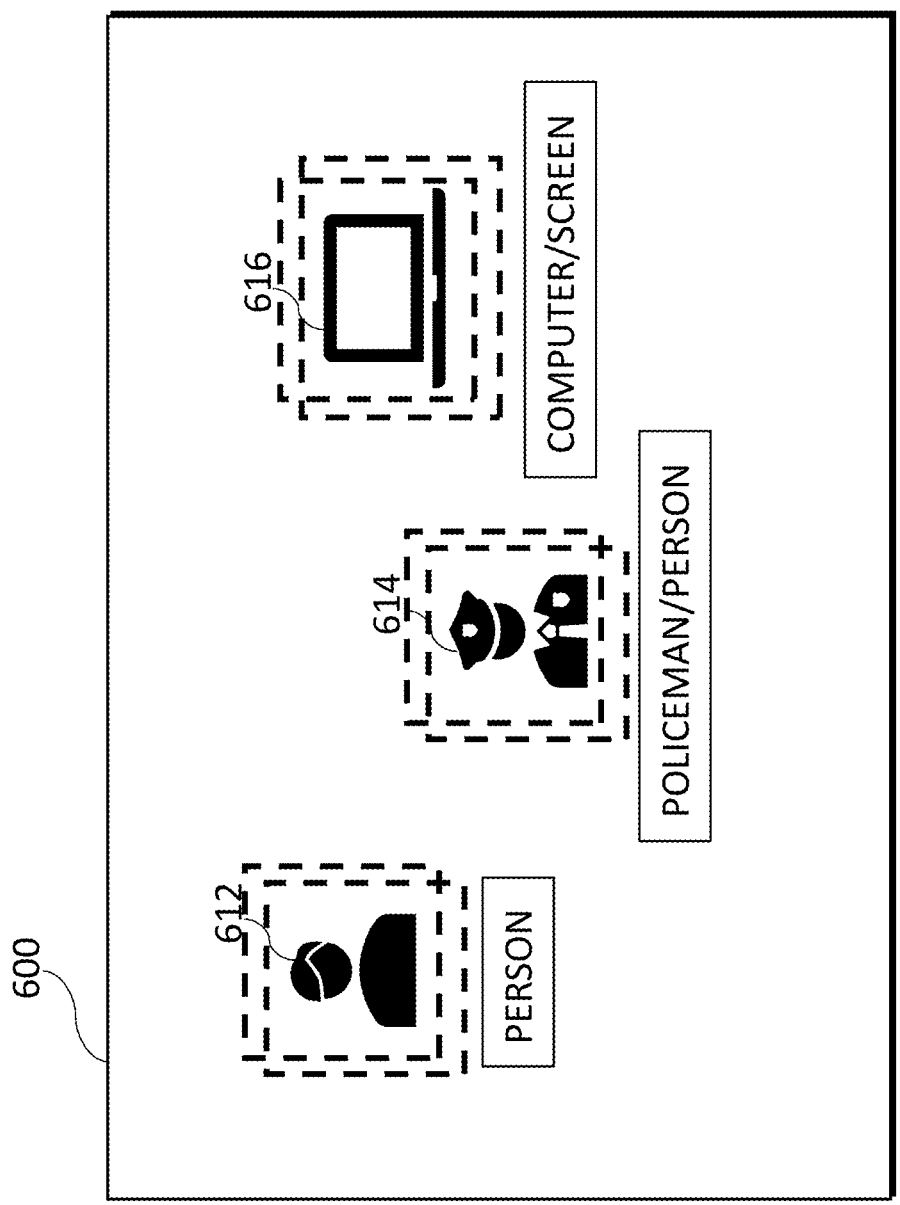

In some embodiments, in step 206, the annotations may be translated back into the original images, as shown in FIGS. 5C and 6C. For example, the set of segmentations and associated class labels may be copied back to corresponding coordinates in the original image 500. Accordingly, as shown in FIG. 5C, image 500 may receive the annotations generated in step 204, wherein river 506 has conflicting labels "road" and "river," based on the diverging annotation process with respect to each split transformed image 502, 504. Similarly, the bounded objects in FIG. 6C may receive the corresponding bounding regions from transformed images and screen."

In some embodiments, in step 208, a class label scoring matrix may be created, to identify class label pairs which present potential conflicting and/or ambiguous categories with respect to the classification task.

Accordingly, with respect to FIG. 5C, a matrix may be created, where, for each pair of class labels, one point is added in a cell where a pixel received both class labels in the pair:

|  | FACTORY | ROAD | RIVER | BUILDING | BRIDGE | HOUSE |
| --- | --- | --- | --- | --- | --- | --- |
| FACTORY | 1018665 | 0 | 0 | 0 | 0 | 0 |
| ROAD | 0 | 16654 | 0 | 0 | 0 | 0 |
| RIVER | 0 | 10535 | 1017074 | 0 | 0 | 0 |
| BUILDING | 27851 | 0 | 0 | 90555 | 0 | 28533 |
| BRIDGE | 530 | 0 | 0 | 0 | 2612844 | 0 |
| HOUSE | 102412 | 0 | 0 | 24835 | 0 | 973284 |

As can be seen in the matrix, the cells on the diagonal extending from the upper left to the lower right represent the intersection of like class labels, wherein it is expected that the same class label will be assigned concurrently to a given pixel in the split transformed images 502, 504 during annotation. Conversely, pairs such as "road"/"building" were not assigned concurrently to any single pixel in the split transformed images 502, 504, and, accordingly, the cell representing the intersection "road"/"building" has a value of zero. This may serve as an indication that the pair of class labels "road"/"building" represents a robust differentiation which leads to an accurate annotation of buildings and roads, respectively.

However, it may be observed that the pair "house"/"factory" represents a less robust differentiation or distinction, because, as evident in FIG. 5B, house 506 was perceived multiple times as either a house or as a factory in split images 502, 504.

In the case of bounding regions detection, as shown in FIG. 6C, a slightly different matrix may be created, where each cell at an intersection of two class labels receives one point when an object has been annotated with bot class labels:

|  | COMPUTER | SCREEN | PERSON | POLICEMAN |
|---|---|---|---|---|
| COMPUTER | 0 | 0 | 0 | 0 |
| SCREEN | 1 | 0 | 0 | 0 |
| PERSON | 0 | 0 | 0 | 1 |
| POLICEMAN | 0 | 0 | 0 | 0 |

As can be seen, the class labels "policeman" can be confused with "person," and "computer' with "screen."

In some embodiments, in step 210, the created matrix may be normalized, such that class label pairs may receive a normalized ambiguity score of between 0-1, wherein a score closer to 1 indicates concurrence in the application of a pair of class labels to a pixel in image 500:

|  | FACTORY | ROAD | RIVER | BUILDING | BRIDGE | HOUSE |
|---|---|---|---|---|---|---|
| FACTORY | 1.0 | 0.0 | 0.0 | 0.0 | 0.0 | 0.0 |
| ROAD | 0.0 | 1.0 | 0.0 | 0.0 | 0.0 | 0.0 |
| RIVER | 0.0 | 0.2580 | 0.48355 | 0.0 | 0.0 | 0.0 |
| BUILDING | 0.021 | 0.0 | 0.0 | 0.9881 | 0.0 | 28533 |
| BRIDGE | 0.00012 | 0.0 | 0.0 | 0.0 | 0.99002 | 0.0 |
| HOUSE | 0.3456 | 0.0 | 0.0 | 24835 | 0.0 | 0.7104 |

In some embodiments, in step 212, the normalized score may be used to resolve identified potential conflicts between category pairs. Accordingly, in some embodiments, the set of provided class labels may be revised by, e.g., splitting one or more categories into sub-categories, combing two or more categories into a single category, etc. In some embodiments, high-scoring category pairs may be flagged for annotators for extra care in annotating, etc.

In some embodiments, once the class labels set has been revised to resolve identified potential ambiguities, the process comprising steps 202-212 may be repeated with respect to the revised set, to further identify any remaining ambiguities.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   at least one hardware processor; and
   a non-transitory computer-readable storage medium having stored thereon program instructions, the program instructions executable by the at least one hardware processor to:
      receive, as input, a training dataset for training a machine learning model, comprising:
         (i) a plurality of images, and
         (ii) a set of classes associated with one or more objects in each of said images, select at least one image from said dataset,
      apply one or more transformations to said selected image, to create a set of transformed images, wherein each of said transformed images includes a representation of at least one of said one or more objects,
      receive annotations with respect to at least some of said objects in said selected image and at least some of said transformed images, wherein said annotations comprise assigning each of said one or more objects to one of said classes,
      calculate an ambiguity score with respect to at least one pair of classes in said set of classes, based, at least in part, on a number of times said annotations assigned one of said objects to both of said classes in said pair,
      optimize said set of classes to generate an optimized set of classes, based, at least in part on all of said calculated ambiguity scores, and
      construct a modified version of said training dataset comprising:
         (iii) said plurality of images, and
         (iv) said optimized set of classes.

2. The system of claim 1, wherein said optimized set of classes is generated by performing one or more of: removing, from said set of classes, at least one class in said at least one pair of classes, when said ambiguity score with respect to said at least one pair of classes exceeds a specified threshold; dividing at least one class in said at least one pair of classes into two or more sub-classes, when said ambiguity score with respect to said at least one pair of classes exceeds a specified threshold; and adding one or more new classes to said set of classes.

3. The system of claim 1, wherein said transformations comprise dividing said selected image into two or more sub-images, wherein at least one pair of adjacent sub-images of said two or more sub-images includes an overlapping region.

4. The system of claim 3, wherein said transformations are selected from the group consisting of: image tiling, image patch extraction, and image splitting.

5. The system of claim 3, wherein at least one of said sub-images undergoes a further transformation selected from the group consisting of: image enhancement, image contrast enhancement, image contrast stretching, image gray level thresholding, image color changes, image filtering, image Gaussian blur, image sharpening, image gamma correction, image shearing, image padding, image reflection, image warping, image scaling, image rotation, image translation, image flipping, an affine image transformation, and a geometric image transformation.

6. The system of claim 1, wherein, with respect to any one of said annotated objects, said annotation comprises at least one of: enclosing said object in a bounding region, enclosing said object in a three-dimensional region; representing said object as a polygon mesh; denoting a set of landmarks associated with said object; denoting a set of lines associated with said object; denoting segmentation boundaries associated with said object; denoting a text annotation associated with said object; and detecting video tracking information associated with said object.

7. The system of claim 1, wherein, with respect to any one of said annotated objects, said annotation comprises (i) denoting segmentation boundaries associated with said object, and (ii) assigning each pixel within said segmentation boundaries to one of said classes.

8. A method comprising:
  receiving, as input, a training dataset for training a machine learning model, comprising:
    (i) a plurality of images, and
    (ii) a set of classes associated with one or more objects in each of said images;
  selecting at least one image from said dataset;
  applying one or more transformations to said selected image, to create a set of transformed images, wherein each of said transformed images includes a representation of at least one of said one or more objects;
  receive annotations with respect to at least some of said objects in said selected image and at least some of said transformed images, wherein said annotations comprises assigning each of said one or more objects to one of said classes;
  calculating an ambiguity score with respect to at least one pair of classes in said set of classes, based, at least in part, on a number of times said annotations assigned a one of said objects to both of said classes in said pair,
  optimizing said set of classes to generate an optimized set of classes, based, at least in part on all of said calculated ambiguity scores, and
  constructing a modified version of said training dataset comprising:
    (iii) said plurality of images, and
    (iv) said optimized set of classes.

9. The method of claim 8, wherein said optimized set of classes is generated by performing one or more of: removing, from said set of classes, at least one class in said at least one pair of classes, when said ambiguity score with respect to said at least one pair of classes exceeds a specified threshold; dividing at least one class in said at least one pair of classes into two or more sub-classes, when said ambiguity score with respect to said at least one pair of classes exceeds a specified threshold; and adding one or more new classes to said set of classes.

10. The method of claim 8, wherein said transformations comprise dividing said selected image into two or more sub-images, wherein at least one pair of adjacent sub-images of said two or more sub-images includes an overlapping region.

11. The method of claim 10, wherein said transformations are selected from the group consisting of: image tiling, image patch extraction, and image splitting.

12. The method of claim 10, wherein at least one of said sub-images undergoes a further transformation selected from the group consisting of: image enhancement, image contrast enhancement, image contrast stretching, image gray level thresholding, image color changes, image filtering, image Gaussian blur, image sharpening, image gamma correction, image shearing, image padding, image reflection, image warping, image scaling, image rotation, image translation, image flipping, an affine image transformation, and a geometric image transformation.

13. The method of claim 8, wherein, with respect to any one of said annotated objects, said annotation comprises at least one of: enclosing said object in a bounding region, enclosing said object in a three-dimensional region; representing said object as a polygon mesh; denoting a set of landmarks associated with said object; denoting a set of lines associated with said object; denoting segmentation boundaries associated with said object; denoting a text annotation associated with said object; and detecting video tracking information associated with said object.

14. The method of claim 13, wherein, with respect to any one of said annotated objects, said annotation comprises (i) denoting segmentation boundaries associated with said object, and (ii) assigning each pixel within said segmentation boundaries to one of said classes.

15. A computer program product comprising a non-transitory computer-readable storage medium having program instructions embodied therewith, the program instructions executable by at least one hardware processor to:
  receive, as input, a training dataset for training a machine learning model, comprising:
    (i) a plurality of images, and
    (ii) a set of classes associated with one or more objects in each of said images;
  select at least one image from said dataset;
  apply one or more transformations to said selected image, to create a set of transformed images, wherein each of said transformed images includes a representation of at least one of said one or more objects;
  receive annotations with respect to at least some of said objects in said selected image and at least some of said transformed images, wherein said annotations comprises assigning each of said one or more objects to one of said classes; and
  calculate an ambiguity score with respect to at least one pair of classes in said set of classes, based, at least in part, on a number of times said annotations assigned one of said objects to both of said classes in said pair,
  optimize said set of classes to generate an optimized set of classes, based, at least in part on all of said calculated ambiguity scores; and
  construct a modified version of said training dataset comprising:
    (iii) said plurality of images, and
    (iv) said optimized set of classes.

16. The computer program product of claim 15, wherein said optimized set of classes is generated by performing one or more of: removing, from said set of classes, at least one class in said at least one pair of classes, when said ambiguity score with respect to said at least one pair of classes exceeds a specified threshold; dividing at least one class in said at least one pair of classes into two or more sub-classes, when said ambiguity score with respect to said at least one pair of classes exceeds a specified threshold; and adding one or more new classes to said set of classes.

17. The computer program product of claim 15, wherein said transformations comprise dividing said selected image into two or more sub-images, wherein at least one pair of adjacent sub-images of said two or more sub-images includes an overlapping region.

* * * * *